United States Patent
Sampayo et al.

(10) Patent No.: US 10,372,522 B2
(45) Date of Patent: Aug. 6, 2019

(54) MEMORY PROTECTION IN HIGHLY PARALLEL COMPUTING HARDWARE

(71) Applicant: Advanced Micro Devices, Inc., Sunnyvale, CA (US)

(72) Inventors: Carlos Sampayo, Orlando, FL (US); Michael Mantor, Orlando, FL (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 166 days.

(21) Appl. No.: 15/582,443

(22) Filed: Apr. 28, 2017

(65) Prior Publication Data

US 2018/0314579 A1    Nov. 1, 2018

(51) Int. Cl.
*G06F 11/00* (2006.01)
*G06F 11/07* (2006.01)
*G06F 9/38* (2018.01)

(52) U.S. Cl.
CPC ........ *G06F 11/0772* (2013.01); *G06F 9/3865* (2013.01); *G06F 11/0721* (2013.01); *G06F 11/0793* (2013.01)

(58) Field of Classification Search
CPC .................................................. G06F 11/0772
USPC ........................ 714/10, 11–13, 6.2, 6.21, 6.1
See application file for complete search history.

(56) References Cited

U.S. PATENT DOCUMENTS

| | | | | |
|---|---|---|---|---|
| 6,003,151 A * | 12/1999 | Chuang | ............... | G06F 11/1008 714/48 |
| 8,601,310 B2 * | 12/2013 | Dreier | ................. | G06F 11/1666 714/6.1 |
| 8,812,898 B1 * | 8/2014 | Lahon | ..................... | G06F 11/10 714/4.2 |
| 2008/0235454 A1 * | 9/2008 | Duron | ................. | G06F 11/1064 711/128 |
| 2011/0119526 A1 * | 5/2011 | Blumrich | .......... | G06F 15/17381 714/16 |
| 2013/0073895 A1 * | 3/2013 | Cohen | ................. | G06F 11/1096 714/6.2 |
| 2014/0189421 A1 * | 7/2014 | Werner | ............... | G06F 11/2056 714/6.21 |
| 2018/0181496 A1 * | 6/2018 | King | ................... | G06F 12/1027 |

* cited by examiner

*Primary Examiner* — Dieu Minh T Le
(74) *Attorney, Agent, or Firm* — Volpe and Koenig, P.C.

(57) ABSTRACT

Techniques for handling memory errors are disclosed. Various memory units of an accelerated processing device ("APD") include error units for detecting errors in data stored in the memory (e.g., using parity protection or error correcting code). Upon detecting an error considered to be an "initial uncorrectable error," the error unit triggers transmission of an initial uncorrectable error interrupt ("IUE interrupt") to a processor. This IUE interrupt includes information identifying the specific memory unit in which the error occurred (and possible other information about the error). A halt interrupt is generated and transmitted to the processor in response to the data having the error being consumed (i.e., used by an operation such as an instruction or command), which causes the APD to halt operations. If the data having the error is not consumed, then the halt interrupt is never generated (that the error occurred may remain logged, however).

20 Claims, 7 Drawing Sheets

MEMORY PROTECTION IN HIGHLY PARALLEL COMPUTING HARDWARE

TECHNICAL FIELD

The disclosed embodiments are generally directed to memory protection, and, in particular, memory protection in highly parallel computing hardware.

BACKGROUND

Hardware for rendering three-dimensional graphics is highly parallel and includes a large number of individual processing units that request data from memory, perform calculations on the data, and provide processed data to a frame buffer for output to a screen. In addition to graphics operations, such hardware is also capable of performing general computing tasks. Some such tasks require memory protection, such as parity protection and error correcting code. Improvements in such protection are constantly being made.

BRIEF DESCRIPTION OF THE DRAWINGS

A more detailed understanding may be had from the following description, given by way of example in conjunction with the accompanying drawings wherein.

DETAILED DESCRIPTION

The present disclosure is directed to techniques for handling memory errors in highly parallel computer devices such as an accelerated processing device ("APD") that is used for generic computing. Various memory units of the APD include error units that are capable of detecting errors in data stored in the memory (e.g., using parity protection, error correcting code, or other error detection or correction techniques). Upon detecting an error considered to be an "initial uncorrectable error," the error unit triggers transmission of an initial uncorrectable error interrupt ("IUE interrupt") to a processor such as a central processing unit ("CPU"). This IUE interrupt includes information identifying the specific memory unit in which the error occurred. A halt interrupt is generated and transmitted to the processor in response to the data having the error being consumed (i.e., used by an operation such as an instruction or command), which causes the process that triggered the first uncorrectable error to halt. If the data having the error is not consumed, then the halt interrupt is never generated and the process continues execution. Some errors are considered fatal for a variety of reasons. For these types of errors, all processing on the APD is stopped and a fatal error signal is sent to the processor informing the processor that a fatal error occurred. The memories of the APD are then flushed, except for memories that logged data indicating information about the fatal error (e.g., when that error occurred, what process cause it, what memory the error occurred in, and other information identifying the fatal error).

Figure 1:
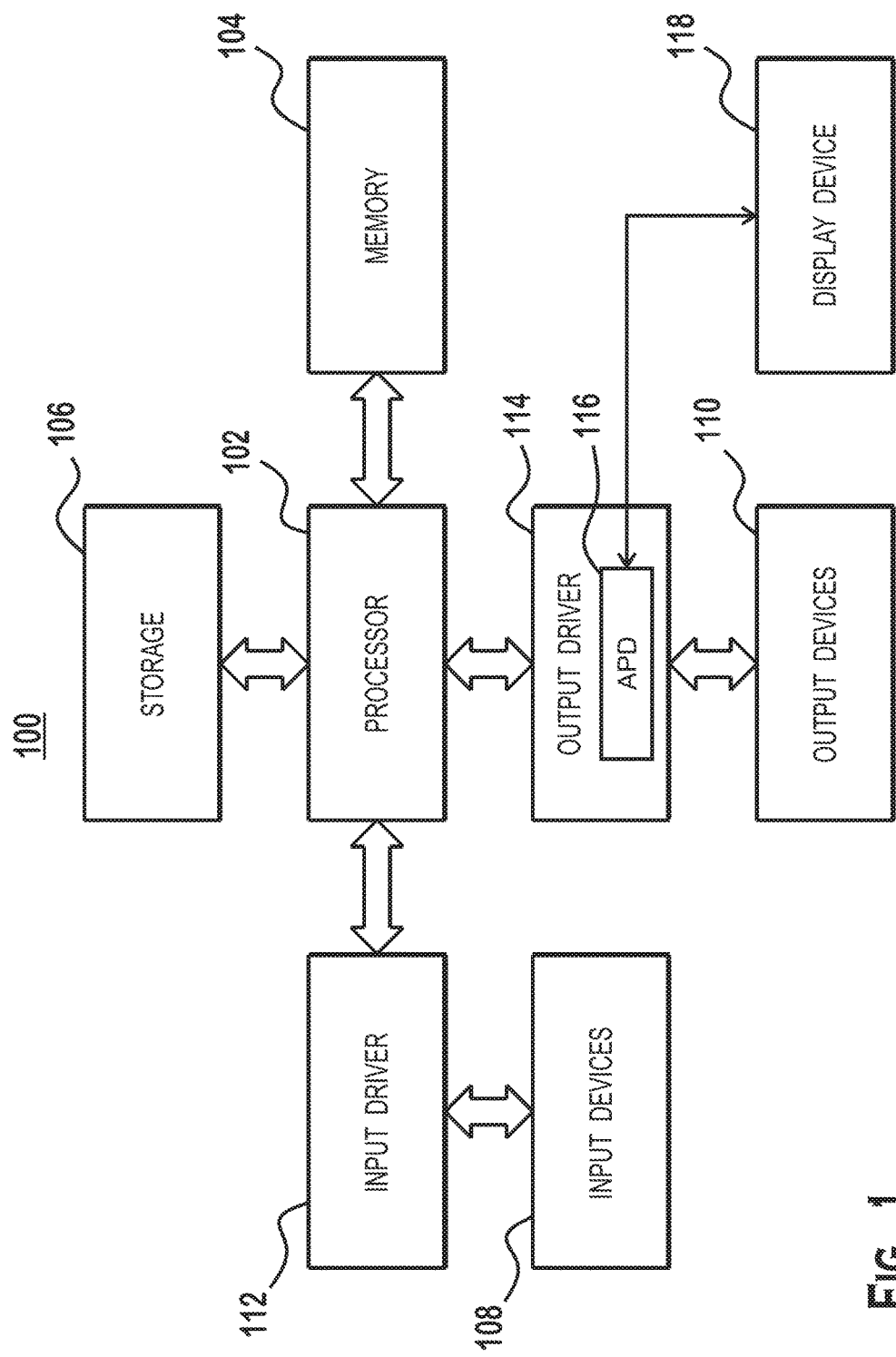
FIG. 1 is a block diagram of an example device in which one or more disclosed embodiments may be implemented.

FIG. 1 is a block diagram of an example device 100 in which one or more aspects of the present disclosure are implemented. The device 100 includes, for example, a computer, a gaming device, a handheld device, a set-top box, a television, a mobile phone, or a tablet computer. The device 100 includes a processor 102, a memory 104, a storage device 106, one or more input devices 108, and one or more output devices 110. The device 100 also includes input drivers 112 and output drivers 114 that drive input devices 108 and output devices 110, respectively. It is understood that the device 100 may include additional components not shown in FIG. 1.

The processor 102 includes a central processing unit (CPU), a graphics processing unit (GPU), a CPU and GPU located on the same die, or one or more processor cores, wherein each processor core may be a CPU or a GPU. The memory 104 is located on the same die as the processor 102, or may be located separately from the processor 102. The memory 104 includes a volatile or non-volatile memory, for example, random access memory (RAM), dynamic RAM, or a cache.

The storage device 106 includes a fixed or removable storage, for example, a hard disk drive, a solid state drive, an optical disk, or a flash drive. The input devices 108 include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include a display, a speaker, a printer, a haptic feedback device, one or more lights, an antenna, or a network connection (e.g., a wireless local area network card for transmission and/or reception of wireless IEEE 802 signals).

The input drivers 112 communicate with the processor 102 and the input devices 108, and permit the processor 102 to receive input from the input devices 108. The output drivers 114 communicate with the processor 102 and the output devices 110, and permit the processor 102 to send output to the output devices 110. The output drivers 114 include an accelerated processing device (APD) 116 which is coupled to a display device 118. The APD 116 is configured to accept compute commands and graphics rendering commands from processor 102, to process those compute and graphics rendering commands, and to provide pixel output to display device 118 for display.

The APD 116 includes one or more parallel processing units configured to perform computations in accordance with a single-instruction-multiple-data ("SIMD") paradigm. However, functionality described as being performed by the APD 116 may also be performed by processing devices that do not process data in accordance with a SIMD paradigm.

Figure 2:
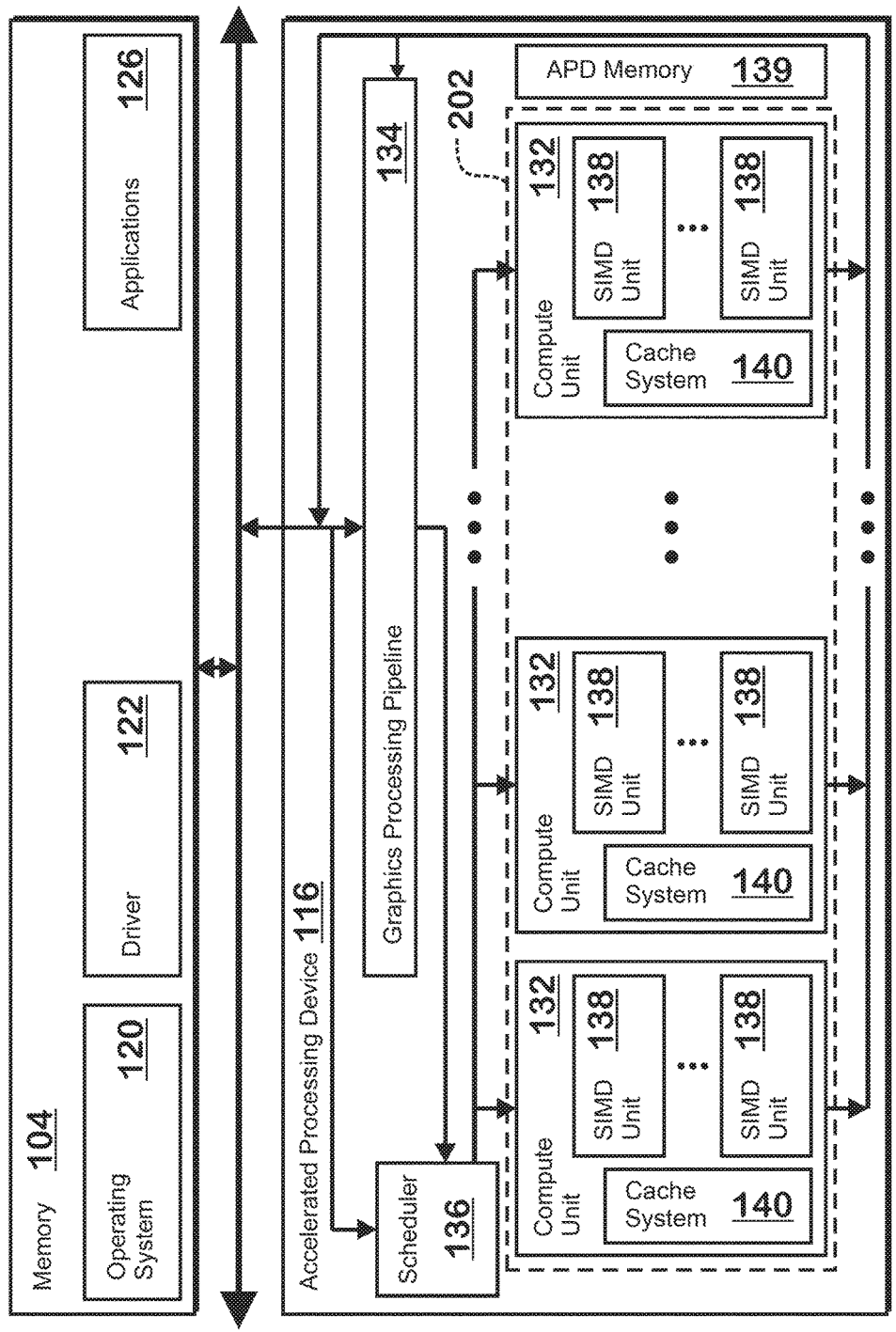
FIG. 2 is a block diagram illustrating an accelerated processing device ("APD"), according to an example.

FIG. 2 is a block diagram of an accelerated processing device 116, according to an example. The processor 102 maintains, in system memory 104, one or more control logic modules for execution by the processor 102. The control logic modules include an operating system 120, a driver 122, and applications 126. These control logic modules control various aspects of the operation of the processor 102 and the APD 116. For example, the operating system 120 directly communicates with hardware and provides an interface to the hardware for other software executing on the processor 102. The driver 122 controls operation of the APD 116 by, for example, providing an application programming interface ("API") to software (e.g., applications 126) executing on the processor 102 to access various functionality of the APD 116. The driver 122 also includes a just-in-time compiler that compiles shader programs for execution by processing components (such as the SIMD units 138 discussed in further detail below) of the APD 116.

The APD 116 executes commands and programs for selected functions, such as graphics operations and non-graphics operations, which may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations or that are completely unrelated to graphics operations, such as, without limitation, operations related to video, physics simulations, computational fluid dynamics, or other tasks, based on commands received from the processor 102 or some other unit.

The APD 116 includes compute units 132 (which may collectively be referred to herein as "programmable processing units 202") that include one or more SIMD units 138 that are configured to perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by individual lanes, predication of lanes corresponding to control flow paths not currently being executed, and serial execution of different control flow paths, allows for arbitrary control flow to be followed. The compute units 132 include cache systems 140 that cache data retrieved from memory, such as APD memory 139 within APD 116 or system memory 104.

The basic unit of execution in compute units 132 is a work-item. Each work-item represents a single instantiation of a program that is to be executed in parallel in a particular lane. Work-items can be executed simultaneously in a "wavefront" on a single SIMD unit 138. Multiple wavefronts may be included in a "work group," which includes a collection of work-items designated to execute the same program. A work group can be executed by executing each of the wavefronts that make up the work group. The wavefronts may be executed sequentially on a single SIMD unit 138 or partially or fully in parallel on different SIMD units 138. Wavefronts can be thought of as the largest collection of work-items that can be executed simultaneously on a single SIMD unit 138. In alternative examples, a single wavefront cannot execute simultaneously on a single SIMD unit 138 but is instead broken down into wavefront portions, each of which can be executed simultaneously on a SIMD unit 138. If commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 is configured to perform operations related to scheduling various wavefronts on different compute units 132 and SIMD units 138. Scheduling involves assigning wavefronts for execution on SIMD units 138, determining when wavefronts have ended, and other scheduling tasks.

The parallelism afforded by the compute units 132 is suitable for graphics related operations such as pixel value calculations, vertex transformations, and other graphics operations. A graphics processing pipeline 134 which accepts graphics processing commands from the processor 102 thus provides computation tasks to the compute units 132 for execution in parallel.

The compute units 132 are also used to perform computation tasks not related to graphics or not performed as part of the "normal" operation of a graphics processing pipeline 134 (e.g., custom operations performed to supplement processing performed for operation of the graphics processing pipeline 134). An application 126 or other software executing on the processor 102 transmits programs (often referred to as "compute shader programs") that define such computation tasks to the APD 116 for execution.

Figure 3:
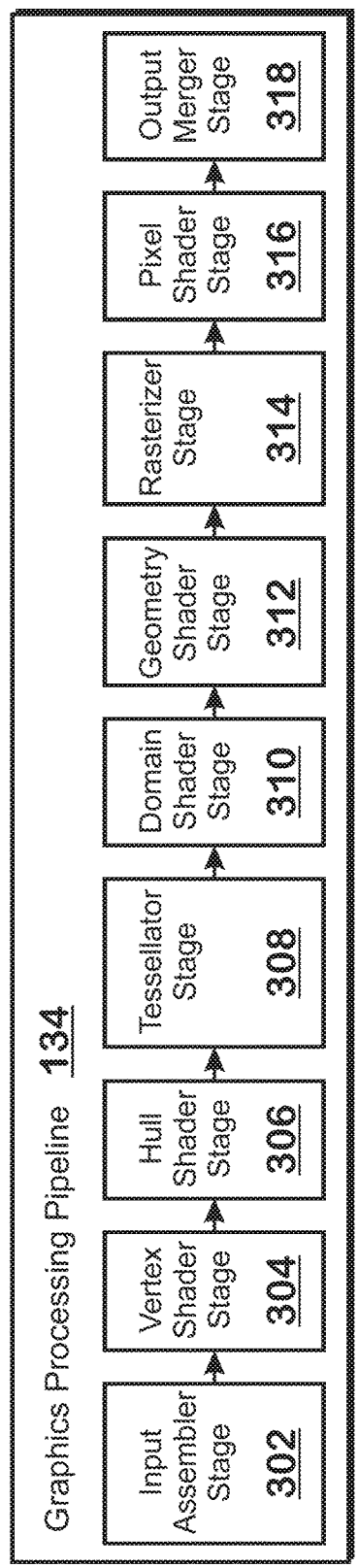
FIG. 3 is a block diagram illustrating a graphics processing pipeline, according to an example.

FIG. 3 is a block diagram showing additional details of the graphics processing pipeline 134 illustrated in FIG. 2. The graphics processing pipeline 134 includes stages, each of which performs specific functionality. The stages represent subdivisions of functionality of the graphics processing pipeline 134. Each stage is implemented partially or fully as shader programs executing in the programmable processing units 202, or partially or fully as fixed-function, non-programmable hardware external to the programmable processing units 202.

The input assembler stage 302 reads primitive data from user-filled buffers (e.g., buffers filled at the request of software executed by the processor 102, such as an application 126) and assembles the data into primitives for use by the remainder of the pipeline. The input assembler stage 302 can generate different types of primitives based on the primitive data included in the user-filled buffers. The input assembler stage 302 formats the assembled primitives for use by the rest of the pipeline.

The vertex shader stage 304 processes vertices of the primitives assembled by the input assembler stage 302. The vertex shader stage 304 performs various per-vertex operations such as transformations, skinning, morphing, and per-vertex lighting. Transformation operations may include various operations to transform the coordinates of the vertices. These operations may include one or more of modeling transformations, viewing transformations, projection transformations, perspective division, and viewport transformations. Herein, such transformations are considered to modify the coordinates or "position" of the vertices on which the transforms are performed. Other operations of the vertex shader stage 304 may modify attributes other than the coordinates.

The vertex shader stage 304 is implemented partially or fully as vertex shader programs to be executed on one or more compute units 132. The vertex shader programs are provided by the processor 102 and are based on programs that are pre-written by a computer programmer. The driver 122 compiles such computer programs to generate the vertex shader programs having a format suitable for execution within the compute units 132.

The hull shader stage 306, tessellator stage 308, and domain shader stage 310 work together to implement tessellation, which converts simple primitives into more complex primitives by subdividing the primitives. The hull shader stage 306 generates a patch for the tessellation based on an input primitive. The tessellator stage 308 generates a set of samples for the patch. The domain shader stage 310 calculates vertex positions for the vertices corresponding to the samples for the patch. The hull shader stage 306 and domain shader stage 310 can be implemented as shader programs to be executed on the programmable processing units 202.

The geometry shader stage 312 performs vertex operations on a primitive-by-primitive basis. A variety of different types of operations can be performed by the geometry shader stage 312, including operations such as point sprint expansion, dynamic particle system operations, fur-fin generation, shadow volume generation, single pass render-to-cubemap, per-primitive material swapping, and per-primitive material setup. Operations for the geometry shader stage 312 may be performed by a shader program that executes on the programmable processing units 202.

The rasterizer stage 314 accepts and rasterizes simple primitives and generated upstream. Rasterization consists of determining which screen pixels (or sub-pixel samples) are covered by a particular primitive. Rasterization is performed by fixed function hardware.

The pixel shader stage 316 calculates output values for screen pixels based on the primitives generated upstream and the results of rasterization. The pixel shader stage 316 may apply textures from texture memory. Operations for the pixel shader stage 316 are performed by a shader program that executes on the programmable processing units 202.

The output merger stage 318 accepts output from the pixel shader stage 316 and merges those outputs, performing operations such as z-testing and alpha blending to determine the final color for a screen pixel.

Figure 4:
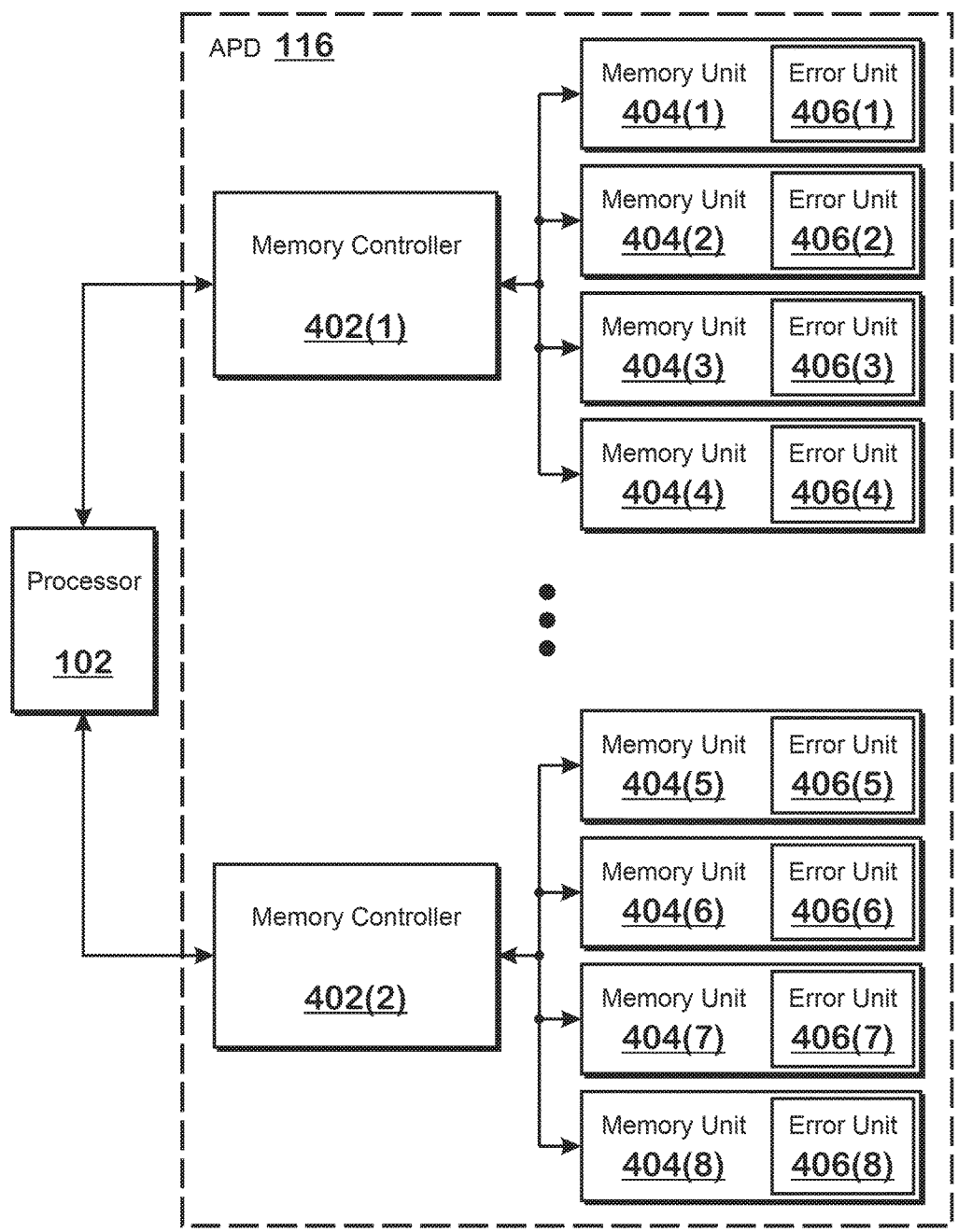
FIG. 4 illustrates aspects of a memory system included within the APD, according to an example.

FIG. 4 illustrates aspects of a memory system 400 included within the APD 116, according to an example. The memory system 400 includes one or more memory controllers 402 coupled to the processor 102 and to one or more memory units 404. One or more of the memory units 404 may be, or may be included in one or more cache system 140 and/or the AP memory 139.

The memory units 404 each include data storage elements for use in execution of shader programs or other operations on the APD 116. A variety of different types of memory units 404 may be included in the memory system 400. Some memory units 404 are dedicated for a specific purpose (e.g., for storing instructions, non-instruction data, or the like), and other memory units 404 store information in a more generic manner. Some examples of memory units 404 include: level 0, 1, or 2 caches, data-specific or instruction-specific caches, general purpose memories that are shared among SIMD units 138 in a compute unit 132, local data store memories that are shared among lanes in a wavefront executing within a SIMD unit 138, and a variety of other blocks that include memory for various purposes.

The memory units 404 illustrated in FIG. 4 include error units 406. The error units 406 perform error detection techniques on the data stored within the associated memory unit 404 (i.e., the memory unit 404 in which the error unit 406 is shown as being inside in FIG. 4). Although the memory units 404 of FIG. 4 are shown as all including error units 406, it should be understood that in some examples, one or more memories of the APD 116 do not include error units 406. The error detection operations include, upon writing data, generating an error code that is based on the data, and upon reading data (e.g., at the request of a compute unit 132 or some other unit of the APD 116), checking the error code against the data to determine whether there is an error in the data.

Many types of error detection techniques to be performed by the error units 406 are possible. One type is parity, in which the error code is one bit that indicates whether the number of 0's (or, in an alternative implementation, 1's) in a data element is even or odd. Parity can detect a single error. Some types of error detection techniques include an error correction operation as well. Those types of error detection techniques include correction operations that are able to correct errors if up to a certain number of errors per unit of data are present. One examples of such error detection technique is a single-error-correct, double-error-detect (SECDED) operation, which corrects one error and is able to detect up to two errors. One SECDED technique uses Hamming codes to detect and correct errors. Other techniques are possible as well. In various example implementations, different memory units 404 apply different error detection techniques. In one example, some memories implement parity and other memories implement SECDED.

For any particular error detection technique, some errors that occur are considered to be correctable errors and some errors that occur are considered to be uncorrectable errors. For parity, all errors that occur are uncorrectable, as parity is only able to detect errors. For SECDED, a single error per unit of data (i.e., per instance of error detection code) is correctable, but more than one error per unit of data is uncorrectable.

The APD 116 notifies the processor 102 when an uncorrectable error occurs. This notification includes an interrupt or a fatal error signal if the error is considered fatal. Errors that occur to instruction, command, or address data (including information specifying a wavefront identity, a physical address, or other similar addressing or command data), or errors that cause an unrecoverable hang, trigger a fatal error. The interrupt is used when the error is not considered fatal and the fatal error signal is used if the error is considered fatal. An interrupt used to notify the processor 102 that an uncorrectable error occurs is an "initial uncorrectable error" ("IUE") interrupt. The purpose of the IUE interrupt is to inform the processor 102 of the memory unit 404 at which the error occurred, and also to inform the processor 102 in a relatively non-delayed manner. In response to a memory unit 404 detecting an initial uncorrectable error, the memory unit transmits an indication that the initial uncorrectable error occurred to the memory controller 402 (this indication may also be referred to herein as an "IUE interrupt signal" or an "IUE signal"). When the memory controller 402 receives the indication, the memory controller 402 generates an IUE interrupt and transmits that interrupt to the processor 102. The interrupt includes an indication that an initial uncorrectable error occurred and also an indication of which memory unit 404 the initial uncorrectable error occurred in. The processor 102 is then able to use the information in the interrupt to make alterations to the work being performed in the APD 116. For example, the processor 102 may kill and relaunch the process that generated the interrupt and/or may take any other appropriate action. The processor 102 may also do nothing, waiting for a halt interrupt to occur, as the IUE interrupt does not necessarily mean that an error in data has actually affected any calculations.

Once an IUE interrupt is transmitted to the processor 102, a IUE interrupt flag is set in the APD 116. While the IUE interrupt flag is set, the APD 116 does not generate and transmit additional IUE interrupts to the processor 102. The processor 102 clears the IUE interrupt flag when the processor 102 has completed processing the IUE interrupt. The interrupt is referred to as "initial" because interrupts for additional uncorrectable errors that are detected are blocked by the flag mechanism.

Detection of an initial uncorrectable error does not cause the APD 116 to halt operations (such as by killing the wavefront that caused the initial uncorrectable error) unless the initial uncorrectable error is considered a fatal error. An initial uncorrectable error is considered a fatal error either if a mode in which all initial uncorrectable errors are considered fatal is set or if the initial uncorrectable error is in data that is considered critical to the operation of the APD 116. Data that is considered critical to the operation of the APD 116 includes address and command information (e.g., data that specifies the address of other data or instructions or data that is, itself an instruction or command).

The APD 116 halts operations (e.g., by killing a wavefront that triggered the uncorrectable error) in response to detecting that data that includes the uncorrectable error is consumed. In this scenario, the APD 116 also transmits a second type of interrupt—a halt interrupt—to the processor 102. More specifically, the halt interrupt is generated by a memory controller 402 in response to detecting that data determined to have an uncorrectable error has been consumed. Data being consumed means that the data is used in an instruction in a compute unit 132 or is used in some other manner (e.g., in a command). For example, with an instruction such as add number 1 and number 2 and put the result in register 1, if number 1 has already been determined to have an uncorrectable error, then the memory controller 402 that attempts to access that piece of data for the instruction generates and transmits an interrupt to the processor 102. This interrupt indicates that a particular piece of data having an uncorrectable error has been used in a calculation.

The APD 116 implements an error propagation mechanism to facilitate detection of the consumption of data that has an uncorrectable error. More specifically, when an uncorrectable error occurs, the memory unit 404 in which the uncorrectable error is detected stores an indication that the data has an uncorrectable error. This indication travels with the data to other memory units 404 as that data propagates through those other memory units 404. When the data is used in a calculation, the memory unit 404 detects that the data has an indication that the data includes an uncorrectable error and the memory controller 402 generates the halt interrupt indicating that data with an uncorrectable error was attempted to be used, and halts operations on the APD 116. Errors that result in an invalid physical address are not propagated through the memory units 404 (e.g., the data for which these errors occur, and an indication that the error occurred, are not copied through different memory units 404 in the APD 116).

In the above description of FIG. 4, the term "halt operations" or similar terms refers to causing processing operations in one or more processing modules (e.g., compute units 132, SIMD units 138, or other modules of the APD 116 not shown that are capable of processing data) to stop. In one example, halting operations includes killing a wavefront that triggered a halt interrupt. When the processor 102 receives the halt interrupt, the processor 102 is able to (e.g., at the request of an application) respawn the wavefront that was killed when the data including the uncorrectable error was consumed. In some examples, halting operations also involve resetting one or more of the processing modules in the APD 116, where resetting includes clearing one or more memory elements of the APD 116 and may include other operations as well.

Figure 5:
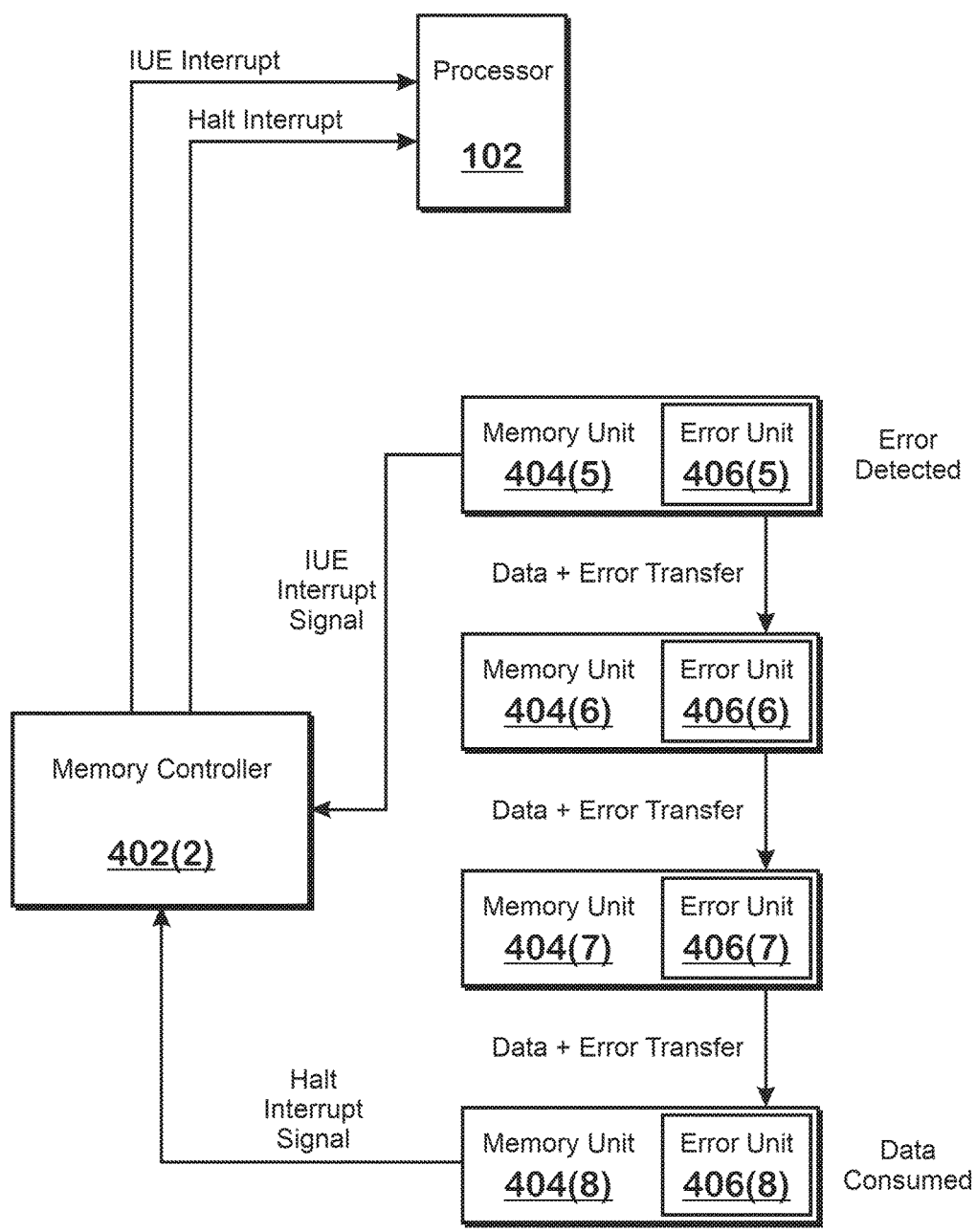
FIG. 5 illustrates an example set of operations that occur when an initial uncorrectable error is detected.

FIG. 5 illustrates an example set of operations that occur when an initial uncorrectable error is detected. An error is detected in the memory unit 404(5). The memory unit 404(5) transmits an initial uncorrectable error signal to the memory controller 402(2), which transmits an initial uncorrectable error interrupt to the processor 102 for processing. The memory unit 404(5) transmits the data that has an error, including an error indicator, to memory unit 404(6). Memory unit 404(6) forwards that data and error indicator to memory unit 404(7), which forwards that data and error indicator to memory unit 404(8). The transferred data is consumed from memory unit 404(8), which causes the memory unit 404(8) to transmit a halt interrupt to the memory controller 402(2), which transmits the halt interrupt to the processor 102. The APD 116 also halts operations for the wavefront that triggered the halt interrupt. With the information included in the initial uncorrectable error interrupt, the processor 102 is able to restart the calculations that caused the error, including generating and launching one or more wavefronts to re-perform the incorrect calculations.

Figure 6:
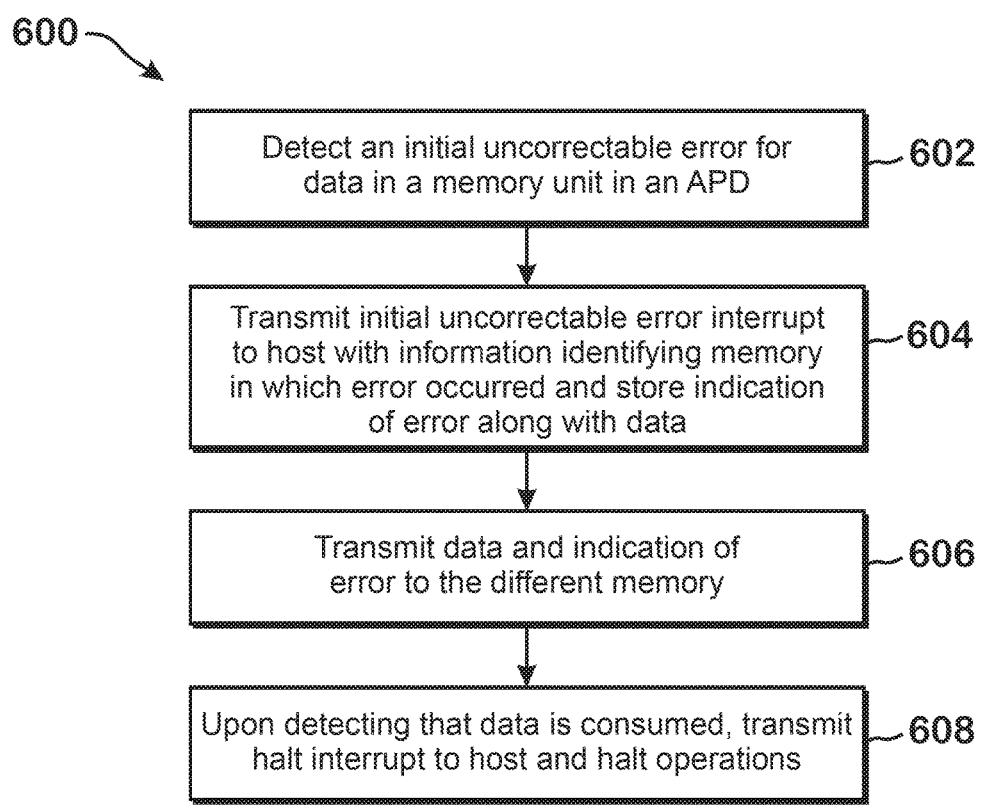
FIG. 6 is a flow diagram of a method for handling errors that occur in memory, according to an example.

FIG. 6 is a flow diagram of a method 600 for handling errors that occur in memory, according to an example. Although described with respect to the system shown and described with respect to FIGS. 1-5, it should be understood that any system configured to perform the method, in any technically feasible order, falls within the scope of the present disclosure.

As shown, a method 600 begins at step 602, where an error unit 406 detects an initial uncorrectable error for data in a memory unit 404 in an APD 116. As described above, the error unit 406 implements one of a variety of error detection techniques, some of which are also capable of correcting errors. For each technique, some errors are uncorrectable. For example, with a single-error-correct double-error-detect ("SECDED") technique, one error is correctable, but two errors are uncorrectable. With a parity technique, any error is uncorrectable. The fact that the error is an "initial" uncorrectable error refers to the fact that many errors may occur in a short period of time, due, for example, to the fact that one error may result in another error occurring. An uncorrectable error is considered not to be initial if an initial uncorrectable interrupt flag is set, meaning that an initial uncorrectable error interrupt flag was previously set without being cleared by the processor 102. The processor 102 typically clears the initial uncorrectable error interrupt flag upon processing the initial uncorrectable error interrupt.

At step 604, in response to detecting the initial uncorrectable error for the data, the memory controller 402 that is coupled to the memory unit 404 that detects the error causes an initial uncorrectable error interrupt to be generated and transmitted to the processor 102. The initial uncorrectable error interrupt includes an identification of the memory unit 404 in which the error occurred. In an example, the identification indicates that the error occurred in a first memory unit 404 that is a data cache and not in second memory unit 404 that is an instruction cache or in a third memory unit 404 that is a local data store of a compute unit 132. At step 606, the data for which the error occurred is to be transferred to another memory unit 404 (which can be done for a variety of reasons, such as an explicit request by an instruction or command to make a transfer, writeback from one level of a cache to another level of a cache, or any other reason causing data to be transferred between memory units 404). The memory unit 404 that transfers the data also transfers an indication that an uncorrectable error occurred to the memory unit 404 that receives the data. Step 606 can occur any number of times (e.g., once each time the data is transferred from one memory unit 404 to another memory unit 404). At step 608, upon detecting that the data for which an error is detected is consumed, the memory unit 404 that detects that the data is consumed transmits a halt interrupt to the processor 102 and causes operations to halt on the APD 116. The halt interrupt informs the processor 102 that data having an error has been consumed. "Consumed" means that the data is used in some operation. In one example, an instruction accepts that data as input in a calculation. In addition, at step 608, the APD 116 halts operation. In one example, halting operations includes killing the wavefront that consumed the data having the uncorrectable error. The processor 102 is subsequently able to generate and respawn that wavefront or any other wavefronts to re-perform the calculations that generated the error.

Referring momentarily back to step 602, in some instances, the initial uncorrectable error is a fatal error. A fatal error occurs either if the APD 116 is operating in a mode in which all initial uncorrectable errors are considered fatal or if the error occurs to data that stores memory addresses or that stores commands or instructions. In this instance, the method 600 does not proceed to steps 604, 606, or 608, because the APD 116 halts operations for the process that triggered the error and thus the data with the error cannot be consumed.

The halt interrupt and IUE interrupt work together to both provide fine-grained information about data errors to the processor 102 and to halt operations when an error is consumed (and not halt operations if the error is not consumed). The error propagation (e.g., copying the indication that an error occurred) through the various memory units 404 helps to halt operations when an error is consumed and not halt operations when not consumed. However, detailed information about where an error occurs would require too much space in the various memory units 404 to be propagated in this manner. Thus, the IUE interrupt provides that detailed information to the processor 102 in the event that an uncorrectable error occurs. If only a halt interrupt were used, then the detailed information about where the error occurred could not be provided to the processor 102. If just the IUE interrupt were used, then a halt could not be prevented from occurring if the data with an error is not consumed. Using both interrupts together allows for both the detailed information to be provided and for a halt to occur when data with an error is consumed and not when that data is not consumed.

Figure 7:
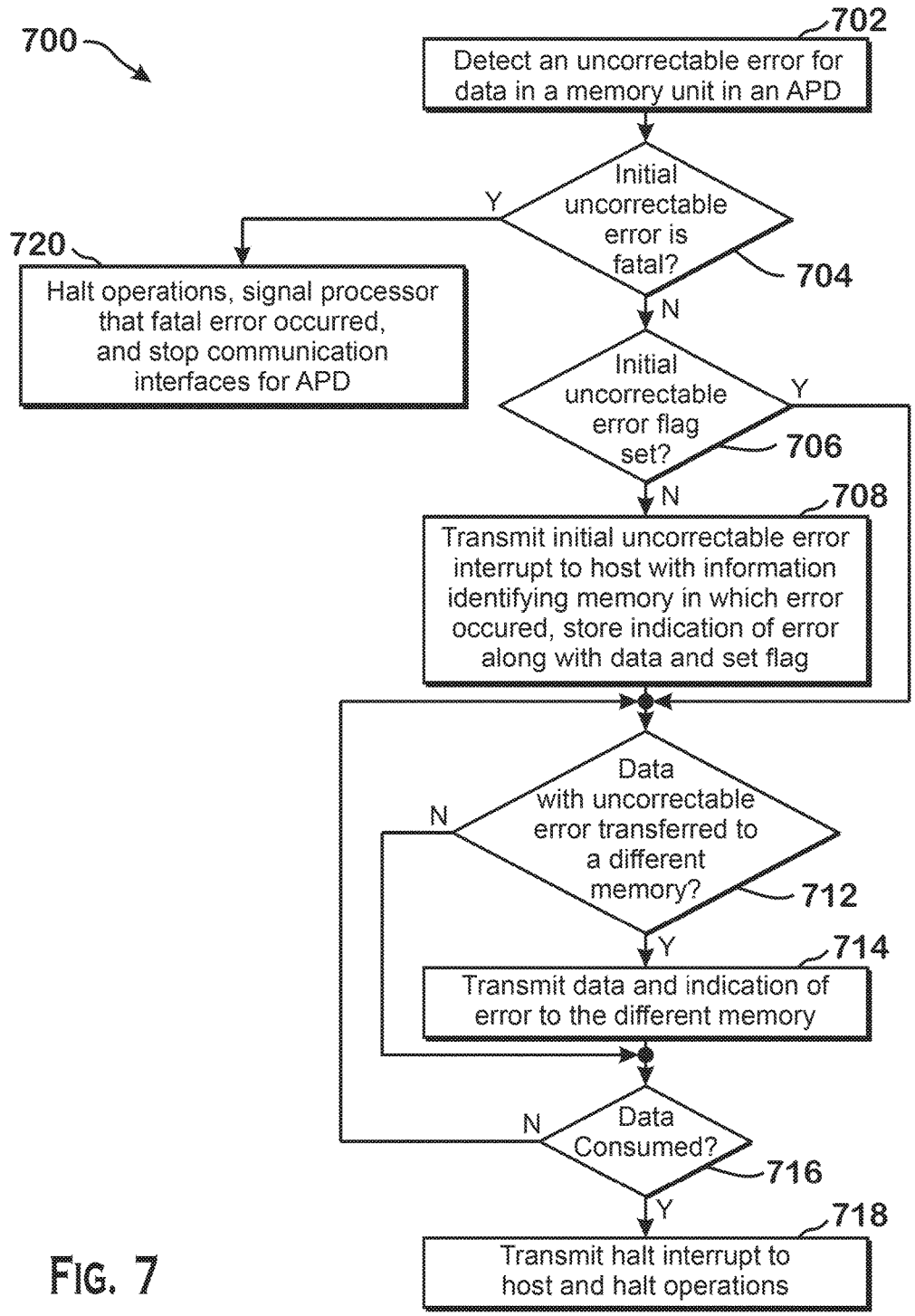
FIG. 7 is a more detailed flow diagram of a method for handling errors that occur in memory, according to an example.

FIG. 7 is a more detailed flow diagram of a method 700 for handling errors that occur in memory, according to an example. Although described with respect to the system shown and described with respect to FIGS. 1-5, it should be understood that any system configured to perform the method, in any technically feasible order, falls within the scope of the present disclosure.

As shown, a method 700 begins at step 702, where an error unit 406 detects an uncorrectable error for data in a memory unit 404. At step 704, the error unit 406 determines whether the error is fatal. The error is fatal either if the error unit 406 is set to a mode where all initial uncorrectable errors are treated as fatal or if the error occurs in data deemed to be "critical." In one example, data is deemed to be critical if that data includes memory addresses or instructions or commands. If the initial uncorrectable error is fatal, then the method proceeds to step 720 and if the initial uncorrectable error is not fatal, then the method proceeds to step 706.

At step 706, the error unit 406 determines whether the initial uncorrectable error flag is set. This flag is set in conjunction with an IUE interrupt being transmitted to the processor 102 and is cleared by the processor 102 upon completion of processing of the IUE interrupt. If the flag is set, then the method 700 proceeds to step 712 and if the flag is not set, then the method 700 proceeds to step 708.

At step 708, the error unit 406 causes a memory controller 402 to transmit an IUE interrupt to the processor 102 (also called a host). The IUE interrupt includes information identifying the specific memory unit 404 in which the error occurred. The processor 102 can use this information in any manner to correct and/or re-perform the work for which the error occurred. The error unit 406 also stores, in the memory unit 404, an indication that an uncorrectable error occurred. The APD 116 sets an initial uncorrectable error flag indicating that an IUE interrupt is being processed by the processor 102.

At step 712, the memory unit 404 that stores the data with the uncorrectable error determines if a transfer of that data is to occur (which can occur for a variety of reasons, such as due to an explicit request for such transfer from an instruction, due to cache write-back, or for any other reason). If a transfer is to occur, then the method 700 proceeds to step 714 and if a transfer is not to occur, then the method 700 proceeds to step 716. At step 714, the memory unit 404 transmits the data along with the indication of the uncorrectable error to the memory unit 404 that is the destination of the transfer. At step 716, the memory unit 404 that stores the data determines whether that data is consumed. Data is consumed when that data is used in an operation. In one example, an instruction executing on a compute unit 132 accepts the data as an input in a calculation. If the data is not consumed, then the method 700 returns to step 712 and if the data is consumed, then the method proceeds to step 718. At step 718 the memory unit 404 transmits a fatal error interrupt to the processor 102 and halts operations in the APD 116.

Referring back to step 406, as stated above, if at step 704, the initial uncorrectable error is fatal, then the method proceeds to step 720. At step 720, the APD 116 halts operations, signals the processor that the fatal error occurred, and stops communication interfaces with the processor 102. The APD then performs a reset operation, clearing at least some data in memories associated with performing processing tasks (e.g., executing wavefronts), but not clearing memories that store data logging what errors occurred, where the errors occurred, when the errors occurred, and other information. The processor 102 is able to read this data after the APD 116 performs the reset operation in order to determine how to restart the workload that caused the error. For example, the processor 102 may be able to determine, based on characteristics of the error that occurred, what work occurred prior to the error and is thus error free, and may then be able to re-start computation from a point after the error occurred.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for handling errors that occur in memory of an accelerated processing device ("APD"), the method comprising:
    detecting a first error in first data in a first memory unit of the APD, the first error being an initial uncorrectable error;
    transmitting a first initial uncorrectable error interrupt ("IUE interrupt") to a processor coupled to the APD, the first IUE interrupt including information identifying the first memory unit as the memory unit in which the first error occurs;
    forwarding the first data with an indication that the first data includes the first error to a second memory unit; and
    upon detecting that the first data is consumed, transmitting a first halt interrupt to the processor and halting operations on the APD.

2. The method of claim 1, further comprising:
    detecting a second error in a second memory unit of the APD, the second memory unit being the first memory unit or another memory unit of the APD, the second error being an initial uncorrectable error;
    determining that the second error is considered fatal; and
    in response to determining that the second error is considered fatal:
        halting communication operations between the APD and the processor.

3. The method of claim 2, wherein determining that the second error is considered fatal comprises:
    determining that a mode is set in which all initial uncorrectable errors are considered fatal; or
    determining that the second error is an error in a memory address, an instruction, or a command.

4. The method of claim 1, further comprising:
    determining that the first error is an initial uncorrectable error by determining that an initial uncorrectable error flag is not set.

5. The method of claim 4, further comprising:
    detecting a second error in second data in a second memory unit of the APD, the second data being either the first data or another data, the second memory unit being either the first memory unit or another memory unit;
    determining that the initial uncorrectable error flag is set; and
    responsive to determining that the initial uncorrectable error flag is set, transmitting no IUE interrupt for the second error to the processor.

6. The method of claim 1, further comprising:
    detecting a second error in second data in a second memory unit of the APD, the second data being either the first data or another data, the second memory unit being either the first memory unit or another memory unit; and
    transmitting a second IUE interrupt to the processor coupled to the APD, the second IUE interrupt including information identifying the second memory unit as the memory unit in which the first error occurs,
    wherein the second data remains unconsumed before being overwritten or deleted in the APD, and
    wherein due to the second data remaining unconsumed before being overwritten or deleted in the APD, no halt interrupt is transmitted to the processor.

7. The method of claim 1, wherein:
    the first error comprises one of an error detected in parity-protected memory or a double error detected in single-error-correct-double-error-detect-protected memory.

8. The method of claim 1, wherein:
    the first memory unit is configured to apply a first type of error detection and a second memory unit in the APD is configured to apply a second type of error detection that is different than the first type of error detection.

9. The method of claim 1, wherein the first memory unit comprises one of:
    an instruction cache, a data cache, a local data store, or a global data store.

10. An accelerated processing device ("APD") comprising:
    a plurality of memory units, each memory unit including an error unit, wherein at least one of the error units is configured to detect a first error in first data in a first memory unit of the plurality of memory units, the first error being an initial uncorrectable error in the first data and to forward an indication of the first error to a different memory unit of the plurality of memory units responsive to the first data being moved from the first memory unit to the different memory unit;
    a memory controller, configured to:
        receive a first uncorrectable error signal from the at least one error unit,
        responsive to the first uncorrectable error signal, transmit a first initial uncorrectable error interrupt ("IUE interrupt") to a processor coupled to the APD, the first IUE interrupt including information identifying the first memory unit as the memory unit in which the first error occurs; and
        upon detecting that the first data is consumed, transmit a first halt interrupt to the processor and halt operations on the APD.

11. The APD of claim 10, wherein:
    a second error unit of a second memory unit of the plurality of memory units is configured to detect a second error in a second memory unit of the APD, the second memory unit being the first memory unit or another memory unit of the APD, the second error being an initial uncorrectable error;

the second error unit is configured to determine that the second error is considered fatal; and
a second memory controller is configured to, in response to determining that the second error is considered fatal, cause the APD to halt communication operations between the APD and the processor.

12. The APD of claim 11, wherein the second error unit is configured to determine that the second error is considered fatal by:
determining that a mode is set in which all initial uncorrectable errors are considered fatal; or
determining that the second error is an error in a memory address, an instruction, or a command.

13. The APD of claim 10, wherein the at least one error unit is configured to determine that the first error is an initial uncorrectable error by determining that an initial uncorrectable error flag is not set.

14. The APD of claim 13, wherein:
a second error unit of a second memory unit of the plurality of memory units is configured to:
detect a second error in second data in the second memory unit;
determine that the initial uncorrectable error flag is set; and
responsive to determining that the initial uncorrectable error flag is set, preventing an IUE interrupt from being transmitted for the second error to the processor.

15. The APD of claim 10, wherein:
a second error unit of a second memory unit of the plurality of memory units is configured to:
detect a second error in second data in a second memory unit of the APD; and
cause a second IUE interrupt to be transmitted to the processor coupled to the APD, the second IUE interrupt including information identifying the second memory unit as the memory unit in which the first error occurs,
wherein the second data remains unconsumed before being overwritten or deleted in the APD, and
wherein due to the second data remaining unconsumed before being overwritten or deleted in the APD, no halt interrupt is transmitted to the processor.

16. The APD of claim 10, wherein:
the first error comprises one of an error detected in parity-protected memory or a double error detected in single-error-correct-double-error-detect-protected memory.

17. The APD of claim 10, wherein:
the first memory unit is configured to apply a first type of error detection and a second memory unit in the APD is configured to apply a second type of error detection that is different than the first type of error detection.

18. The APD of claim 10, wherein the first memory unit comprises one of:
an instruction cache, a data cache, a local data store, or a global data store.

19. A computing system, comprising:
a processor; and
an accelerated processing device ("APD") comprising:
a plurality of memory units, each memory unit including an error unit, wherein at least one of the error units is configured to detect a first error in first data in a first memory unit of the plurality of memory units, the first error being an initial uncorrectable error in the first data and to forward an indication of the first error to a different memory unit of the plurality of memory units responsive to the first data being moved from the first memory unit to the different memory unit;
a memory controller, configured to:
receive a first uncorrectable error signal from the at least one error unit,
responsive to the first uncorrectable error signal, transmit a first initial uncorrectable error interrupt ("IUE interrupt") to the processor, the first IUE interrupt including information identifying the first memory unit as the memory unit in which the first error occurs; and
upon detecting that the first data is consumed, transmit a first halt interrupt to the processor and halt operations on the APD.

20. The computing device of claim 19, wherein:
a second error unit of a second memory unit of the plurality of memory units is configured to detect a second error in a second memory unit of the APD, the second memory unit being the first memory unit or another memory unit of the APD, the second error being an initial uncorrectable error;
the second error unit is configured to determine that the second error is considered fatal; and
a second memory controller is configured to, in response to determining that the second error is considered fatal, cause the APD to halt communication operations between the APD and the processor.

* * * * *